United States Patent [19]
Dodson

[11] 4,330,822
[45] May 18, 1982

[54] RECURSIVE SYSTEM AND METHOD FOR BINDING COMPILED ROUTINES

[75] Inventor: Bill R. Dodson, Pasadena, Calif.

[73] Assignee: Burroughs Corporation, Detroit, Mich.

[21] Appl. No.: 177,304

[22] Filed: Sep. 2, 1971

[51] Int. Cl.³ .......................... G06F 7/00; G06F 9/00
[52] U.S. Cl. .................................... 364/200; 364/300
[58] Field of Search ........................ 444/1; 340/172.5

[56] References Cited

U.S. PATENT DOCUMENTS

| | | | |
|---|---|---|---|
| 3,388,381 | 6/1968 | Prywes et al. | 340/172.5 |
| 3,461,434 | 8/1969 | Barton et al. | 340/172.5 |
| 3,546,677 | 11/1970 | Barton et al. | 340/172.5 |
| 3,548,384 | 12/1970 | Barton et al. | 340/172.5 |
| 3,614,745 | 10/1971 | Podvin | 340/172.5 |

*Primary Examiner*—Gareth D. Shaw
*Attorney, Agent, or Firm*—Mervyn L. Young

[57] ABSTRACT

This disclosure relates to a system and method, residing in a data processing system, for binding together precompiled subroutines to form a complete host procedure object code. Each of the subroutines and the host procedure is provided with a segment dictionary or list of subroutines required by that routine. The system and method are recursive in that the system makes a pass through the segment dictionary for that host procedure to locate descriptors for external or missing subroutines and, when such a missing subroutine descriptor is found, the system and method are recalled or re-entered to search the segment dictionary for that subroutine to locate a next level of subroutines called for by the current subroutine and so on. After a pass through any particular segment dictionary, the system makes a second pass there through to make any required changes in the object code thus called for and that object code is then passed to the new code file being created for the host procedure.

18 Claims, 13 Drawing Figures

RECURSIVE SYSTEM AND METHOD FOR BINDING COMPILED ROUTINES

BACKGROUND OF THE INVENTION

This invention relates to a system and method for binding compiled routines to create a procedure or process to be run by a data processor, the system residing in the data processor. More importantly, the present invention relates to such a system and method which are recursive in nature.

Present day information processing systems employ two standard features to enhance data processing capabilities. One such feature is that of multiprogramming and multiprocessing in order to better utilize the data processor's processing time. Multiprogramming is generally described as the concurrent running of two or more processes or programs in a single processor while multiprocessing is generally described as the employment of two or more processors to concurrently run a plurality of processes or programs. Another feature employed in all present day information processing systems is that of the use of higher level programming languages with which programs may be generated in terms of mathematical symbols and terms having correspondence to the English language so that the programs will have some literal meaning to the user. The various information processing systems are then provided with compilers to receive the higher level language programs for compilation into strings of machine language instructions or object code which in turn are directly readable by the data processing system. In this manner, programs written in a higher level language will not be machine dependent even though the machine language or object code is machine dependent which machine language embodies the program to be run in the system.

With the advent of multiprogramming in either a mono or multiprocessing system, it has been recognized that a large number of the programs, which are to be compiled and then executed by the system, employ the same or at least similar subroutines the compilation of which would be redundant if required for each of the subprocesses of the various host programs. As a result, the technique has been developed of previously compiling such subroutines into machine language and storing them, for example, in the back-up or bulk storage system which may be one or more disk files. A Binder routine is then provided as a part of the operating system to fetch the compiled subroutines when they are called for by the host program and to add them to the object code or machine language strings being created for the compiled form of the host program. Such binding routines in the prior art have been of the iterative form which requires that the binding algorithm must be invoked each time a subroutine is required to be called forth.

As distinct from the iterative form, program routines can be created in a recursive or re-entrant form which, in general, is a more natural form for the embodiment of higher level program languages. That is to say, many higher level program languages such as Algol have procedures which are recursive in nature. When data processing systems are designed for the implementation of such higher level languages, the operating system and any binder routine which is a part thereof, are usually written in that higher level language.

In a very general sense, a recursive routine may be described as one which is adapted to call itself or re-enter itself. It can be demonstrated that a routine can be expressed in either an iterative form or recursive form and that the two forms are logically equivalent. However, each form has its own particularly distinct advantages. Early day computing systems and many of the computing systems in existence today were designed to handle routines in iterative form. For this reason, programs in iterative form are more easily handled by such systems than are programs in recursive form. However, such systems do not readily receive programs written in the more sophisticated higher level languages such as ALGOL 60. Such higher level languages provide flexibility for writing more comprehensive programs, particularly when the ability is provided to employ recursive procedures.

There has been an increasing tendency in the design of present day data processing systems to employ stack oriented processors wherein push down stacks, or first-in last-out stacks, are provided to accommodate nested processes and recursive procedures as employed by particular higher program languages. When such stack oriented processors are provided, then the Master Control Program, and other routines which form a part of the operating system, can also be written in a particular higher level language as well as the various compilers.

It is, then an object of the present invention to provide an improved system and method for creating an object code file of compiled nested routines as called for by a host procedure.

It is another object of the present invention to provide a system and method for the binding of compiled subroutines and making changes in the object code thereof as required to create a new code file for a host procedure.

It is still another object of the present invention to provide a system and method for the binding together of compiled subroutines which system and method are recursive in nature.

SUMMARY OF THE INVENTION

In order to achieve the above described objects, the present invention resides in a system and method for searching for missing subroutine object codes called for by a host procedure. When reference to such a subroutine is found, the system again calls itself to search for any subroutine object codes called for by the now parent subroutine and so on. The system and method are, therefore, recursive or re-entrant. Each of the various subroutines and host procedure is provided with a list of descriptors which reference the object codes for the various routines, which lists are referred to as segment dictionaries. The system begins by searching the segment dictionary for the host procedure to find any descriptor referencing an external or missing subroutine object code. When such a descriptor is found, the system then re-enters itself to search the segment dictionary for that subroutine to find descriptors referencing any lower level subroutine object codes called for by the now parent subroutine. If no lower subroutine descriptor is found, the system exits to its earlier version to search for additional subroutines called for by the parent procedure.

The system makes two passes through each segment dictionary so encountered. During the first pass, a search is made for any descriptors referencing missing subroutines. During the second pass, the system makes any required changes in the object code thus found and transfers that code to a new code file being created for the host procedure.

A feature, then, of the present invention resides in a system and method to be recursively called to search a sequence of nested procedures for references to external or missing subroutine object codes in order to create a new code file of compiled routines for a host procedure. Other features include the manner by which the present invention implements required changes in the various object codes as they are bound to the new code file.

DESCRIPTION OF THE DRAWINGS

The above described and other objects, advantages and features of the present invention will become more readily apparent from a review of the following specification when taken in conjunction with the drawings wherein:

FIG. 5 is a general flow diagram of the system and method of the present invention;

FIG. 8 is a diagram illustrating the structure state of a stack during processing of a bind procedure.

GENERAL DESCRIPTION OF THE SYSTEM

Figures 1, 2:
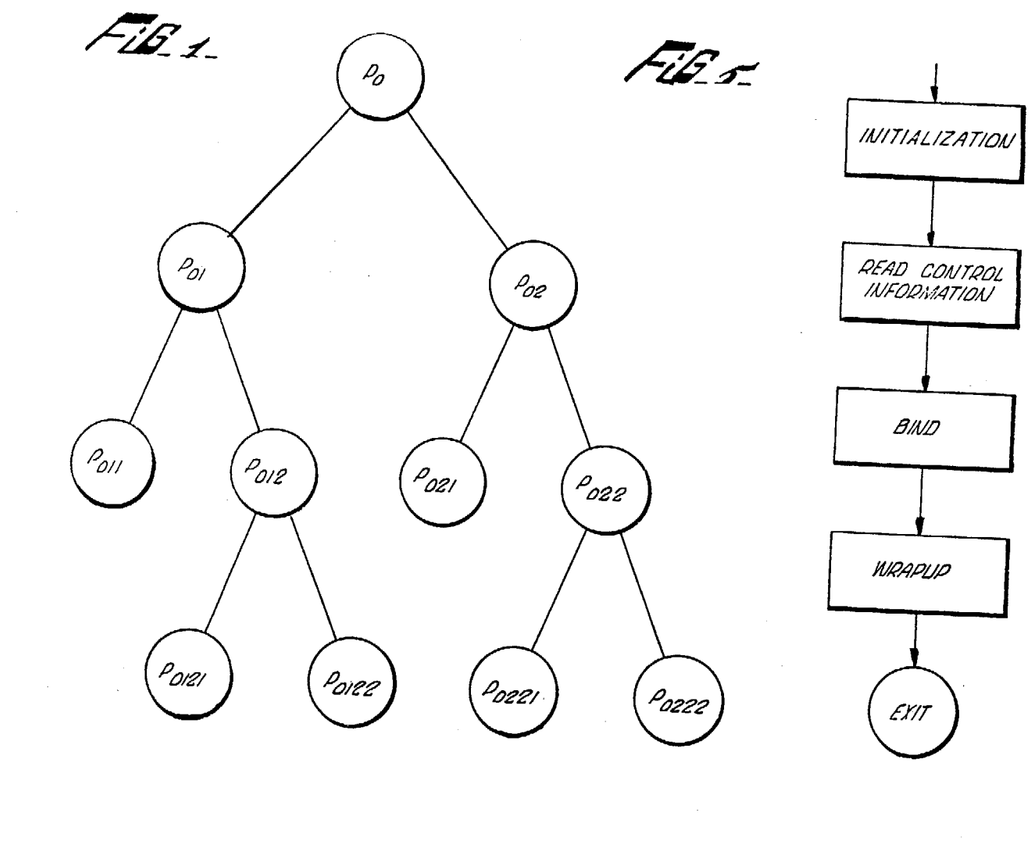
FIG. 1 is a diagram of a series of nested procedures to be bound by the system of the present invention.

The manner in which a host procedure may require the calling forth of a plurality of subprocedures is illustrated in FIG. 1. Procedure $P_0$ is to include as a part thereof the subprocedures $P_{01}$ and $P_{02}$. In a like manner subprocedure $P_{01}$ is required to include subprocedures $P_{011}$ and $P_{012}$ and, therefore, procedure $P_{01}$ is in turn a host for the latter subprocedures and so on. Thus, once the various levels of subprocedures have been compiled, if an iterative binding algorithm were employed to bind the respective compiled subroutines, that algorithm would be invoked each time a new subroutine was called for. With the tree representation of FIG. 1, it is observed that the respective subprocedures are nested within parent procedures all of which are ultimately nested or contained within the host procedure $P_0$. It is for such a system of nested procedures that the recursive binding system and method of the present invention have been developed.

Before generally describing the recursive system and method of the present invention, a general description will be provided of the distinction between recursion and iteration in relation to FIGS. 2A, 2B, 2C and 2D. The routine represented in those figures is merely for demonstrative purposes, and has been selected to be for the simple numerical calculation of the factorial of n (n!). The factorial function may be defined iteratively by the expression:

$$n! = 1 \times 2 \ldots \times n$$

A recursive definition of the factorial function is given by the expression:

$$n! = n(n-1)!$$

Figure 2A:
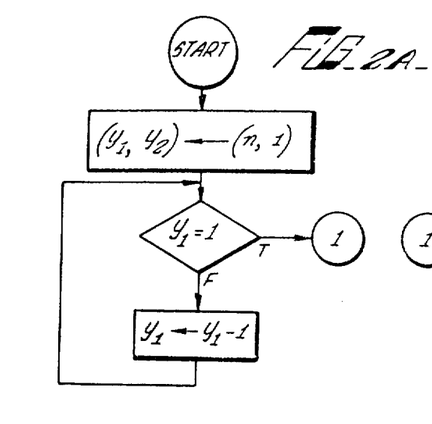
FIGS. 2A, 2B, 2C and 2D are flow diagrams illustrating the distinction between iteration and recursion.
Figure 2B:
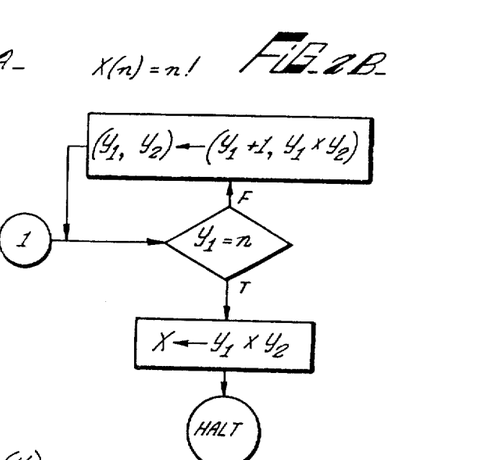
Figure 2C:
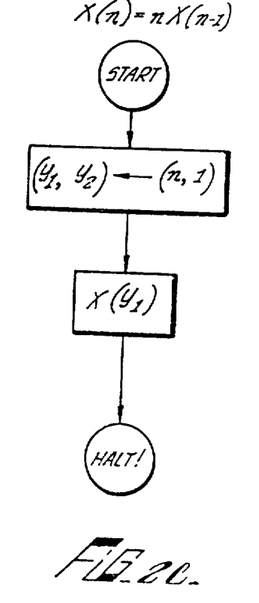
Figure 2D:
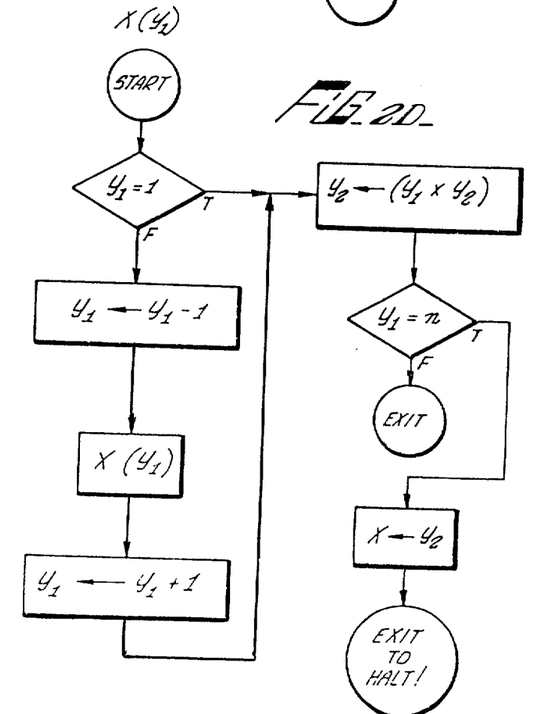

An iterative routine for calculating the iterative definition of the factorial is shown in FIG. 2B where the dummy variables $y_1$ and $y_2$ are both initially set equal to 1. For comparison with the iterative procedure of FIG. 2B, the corresponding recursive procedure for the factorial function is illustrated in FIGS. 2C and 2D. FIG. 2C merely illustrates the set-up routine for the recursive function $X(y_1)$, which function is the procedure of FIG. 2D. That the procedure of FIG. 2D is recursive is demonstrated by the fact that the function calls for itself or again re-enters itself. That is to say, the function $X(y_1)$ which is called for by the procedure of FIG. 2D is the same procedure as represented by the entire flow chart of FIG. 2D which in turn is the function $X(y_1)$ called for by the routine of FIG. 2C.

With the recursive procedure for calculating the factorial function, the procedure continues to enter itself until the value of n has been decremented to 1 for which, the value of the factorial is known. The procedures then calculates the factorial value for that value of n and exits from the procedure. However, the procedure must continue to exit from itself the same number of times that the procedure was re-entered with the end result being the calculation of the value of the factorial for n. The sequence of exiting from the procedure in this example is just the iterative calculation of the factorial of n as illustrated in FIG. 2B. When the factorial is recursively defined for calculation by an iterative procedure, then the procedure of FIG. 2A is employed, this latter procedure being analogous to the re-entrance of the recursive procedure.

The example of calculating the factorial function was chosen merely for demonstrative purposes and, clearly, the simplest way of calculating the factorial function as well as most other numerical functions is by the iterative procedure where the function is iteratively defined. It is for this reason that early day data processors and many present day processors have been designed primarily to handle iterative procedures. However, more complex procedures can be more readily defined in a recursive manner and, in turn, can be more efficiently carried out in a recursive manner, hence the employment of recursive procedure by many of the higher level program languages. The present invention is directed toward the binding of a number of nested procedures, the relationship among which is shown in FIG. 1, the individual procedures having been precompiled.

Figure 3:
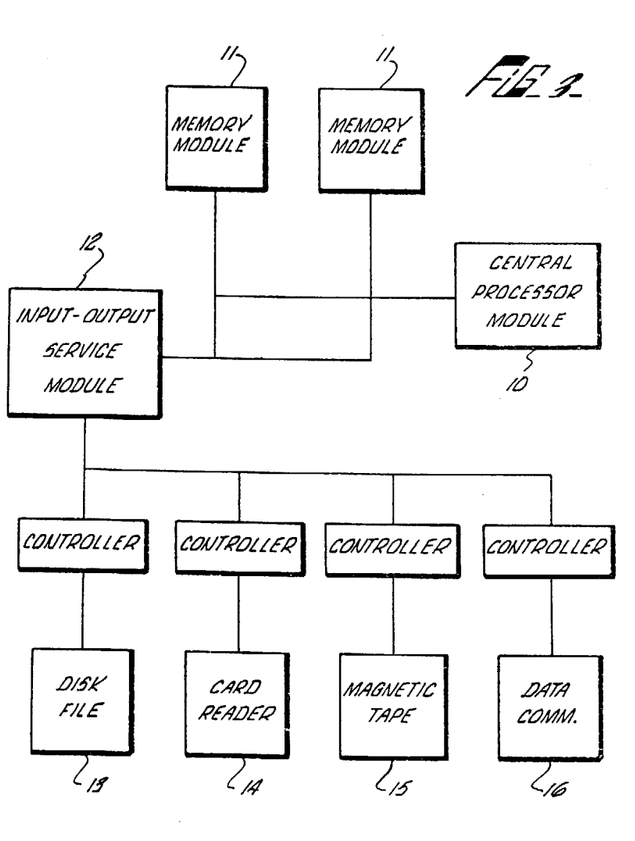
FIG. 3 is a schematic diagram of a data processing system embodying the present invention.

Referring now to FIG. 3, there is shown therein a representation of a general purpose data processing system in which the present invention may be employed. This system may include one or more central processor modules 10 to perform the various data manipulation and moves as may be required by the particular program; one or more memory modules 11 to store data and other information as may be immediately required by a processor; and a plurality of peripheral devices including one or more disk files 13, card readers 14, magnetic tape units 15, and data line communication controllers 16, from which data may be transferred to memory modules 11 or to central processor module 10 by way of input-output module 12. A more detailed description of such a system may be found, for example, in Lynch et al, U.S. Pat. No. 3,411,139 and Anderson et al, U.S. Pat. No. 3,419,849. A particular processor module of the type that may be employed is disclosed in the Barton et al U.S. Pat. Nos. 3,461,434; 3,546,677; and 3,548,384. The Barton et al patents are directed toward a stack oriented data processor. The function of the stack mechanism, a first-in last-out mechanism, is to handle the flow of operators and associated parameters in a manner which reflects the nested structure of particular higher level languages. This in turn allows the Master Control Program for the system to be in such a higher level language, e.g. ALGOL 60, a principle feature of which is the accommodation of recursive procedures. With such a system and Master Control Program, it is then desirable to have a program binding routine which is itself recursive.

Figure 4:
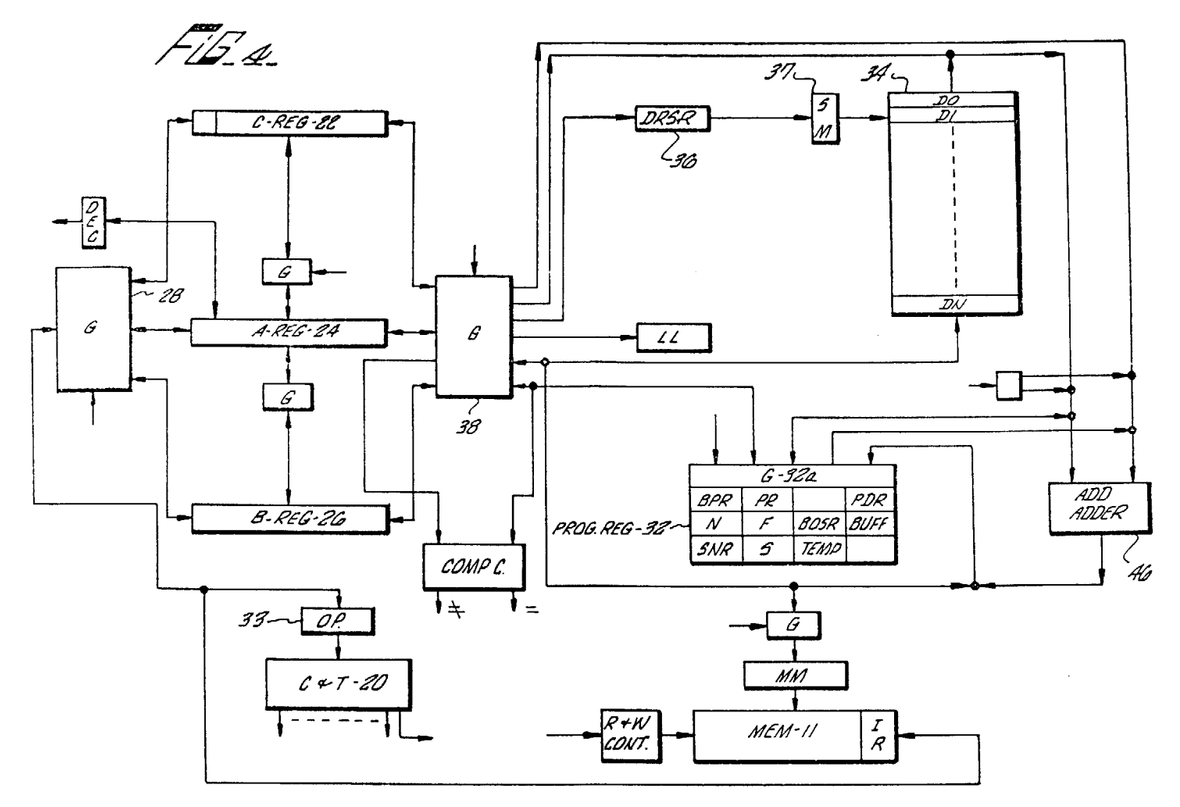
FIG. 4 is a schematic diagram of a data processor employed by the system of FIG. 3.

A stack oriented processor is illustrated in FIG. 4. As indicated therein, the stack mechanism includes A Register 24 and B Register 26 together with a group of storage locations in memory 11. F and S registers in the group of program registers 32 store addresses for memory locations in memory 11 and are used in keeping track of the memory location being used as a stack. The A and B registers 24 and 26 respectively form the top of two storage locations of a stack and are time shared between information stacks. Information is put into the A register and transferred down to the B register, then transferred down from the B register to the corresponding storage locations for the respective stacks in memory 11 by way of gate 28 under control of a control and timing unit 20. Information is brought back out of a stack in reverse order and taken out of the top of the current stack from the A register. The information in the rest of that stack is effectively pushed up one position by appropriately changing the content of the S register contained in the group of program registers 32. The contents of the S register point to the top of the current stack.

Operators for execution by the processor are stored in operator register 33 which is coupled to control and timing unit 20 for use in controlling the sequence of operations of the system. Operators are obtained from memory 11 and are stored in operator register 33 under control of the PR Register in the group of program registers 32. The processor also includes a group of display registers 34 which are referenced in FIG. 4 by the symbols DO . . . DN. Each of the display registers 34 contains an absolute address of the memory location in memory 11 which absolute address references a Mark Stack Control Word (MSCW) which is stored at the beginning of each block of storage in the stacks contained in memory 11.

Associated with the display registers 34 is a selection matrix 37 and a Display Register Selection Register (DRSR) 36. A lexicographical level (11) value is stored in the DRSR Register and designates a particular display register. Selection matrix 37 is responsive to a lexicographical level (11) value contained in Register 36 to provide a signal causing the content of the corresponding display register to be read out of one of the group of display registers 34. Address adder 46 is provided to create the sum of the contents of one of the display registers 34 and contents selected from among A register 24, B register 26 or C register 22 to form an absolute memory address to thus access any location in any one of the corresponding blocks of storage in a particular stack. The reader is referred to the above referenced Barton et al patents for a more detailed description of a preferred embodiment of a stack oriented processor.

Recursion and stack oriented processors having been generally described, a general description will now be provided of the binding algorithm of the present invention. Again, for the sake of explanation, the algorithm of the present invention can be considered as being an infinite number of identical binding procedures B1,B2, . . . where the procedure B1 is called to process the host procedure $P_0$. When B1 detects an external procedure description, it calls the bind procedure B2 to process the binding of the subprocedure $P_{01}$. When the bind procedure B2 finds an external procedure description in $P_{01}$ it then calls the bind procedure B3 to process the binding of the subprocedure $P_{011}$. When the bind procedure B3 has completed its task, it exits back to the bind procedure B2 which now continues to look for another external procedure description, in this case for the subprocedure $P_{012}$ and so forth. Eventually the bind procedure B2 will have completed its task of binding all of the nested procedures called for by procedure $P_1$ and it will exit back to the bind procedure B1 which then continues to look for more external procedure descriptions as called for by the host procedure $P_0$. When bind procedure B1 has completed its task, the end result is the creation of the host procedure $P_0$ in the compiled form of strings of machine language instructions.

The present invention employs but one recursive bind procedure rather than a host of separate bind procedures, the purpose of a recursion being that of allowing the procedure to again call itself as often as necessary to complete the binding of all of the nested procedures in the tree which represents the function of the host procedure. The binding algorithm employed by the present invention operates upon a segment dictionary which is provided by the compilers for the host program and each program unit to be bound to the host program, which segment dictionary includes segment descriptors that contain the address and length counts of code segments; data descriptors which contain the address and length counts of information, other than code, which information was created by the compiler; and external procedure descriptors which are a subset of the data descriptors and contain the address and length counts of the description of the subprogram routines which are to be bound to the host program. The algorithm of the present invention makes two passes through the segment dictionary and, during the first pass, each of these descriptors are examined to see if they are external procedure descriptors. Upon the detection of an external procedure descriptor, the external procedure description is read and interpreted and the information obtained therefrom is employed to construct a file name. If a file by that name is found, it is passed as a parameter to call the recursive bind procedure. At this point, the first copy or version of the bind procedure is suspended while a second copy or version of the bind procedure is employed to examine the subprocedure thus found to determine if that subprocedure in turn calls for additional subprocedures.

After the algorithm employed in the present invention has completed its first pass through a segment dictionary and all the missing subprograms (external procedures) have been bound, it then remains to copy the code for each item so bound into the new code file which is being generated for the host procedure. During the second pass through each segment dictionary, each of the segment and data descriptors are examined and the corresponding code and data described thereby are copied into the new code file being created. During the second pass, changes in the respective code data can be made as required.

While a binding of a given subprocedure to a parent procedure is under way, changes may be required in both the code belonging to the subprocedure. Each version or copy of the binding algorithm is provided in memory with a local reference array (REFARY) in which entries are made for all changes which are required to be made for the subprocedure being bound. As the system of present invention passes from a parent procedure to a subprocedure, a new version of the binding algorithm is called and the REFARY associated with the previous version or copy is passed as a parameter of that version or copy. The parent version of the binding algorithm will also be provided with a local reference array which is designated as the parent reference array (PREFARY) for the present version. It maybe the case, that while the binding of a subprocedure to the parent procedure is taking place, changes will be required not only in the subprocedure code but also in the parent procedure code. Thus, entries maybe made both into the REFARY and also into the PREFARY for changes required in the subprocedure and reflected in the parent procedure. Once the subprocedure has been processed for binding, the processing of the parent procedure (searching for additional external subprocedures to be bound) will continue. Notation of additional changes required in the parent procedure code will be entered in the REFARY for the previous version of the bind algorithm.

All such change entries are made during the first pass through each of the segment dictionaries. During the second pass through each segment dictionary, all necessary changes in the parent procedure code can be made while it is being copied for the creation of the new code file.

SPECIFIC DESCRIPTION OF THE INVENTION

The manner in which the various control information and compiled subroutines are embodied in a data processing system to create the system of the present invention will now described with reference again to FIG. 3. The various precompiled subroutines are entered into the data processing system by way of card reader 14, magnetic tape unit 15, and so forth, and are stored in disk file 13. The binder control information as well as the host code file for the parent program structure are also entered into the system by way of card reader 14 and stored in disk file 13. During the binding procedure, various reference arrays are transferred from disk file 13 to one of the memory modules 11 for the various passes of method of the present invention. The new object code file created by the system and method of the present invention are then stored in disk file 13 for subsequent execution by central processor module 10.

The method of the present invention will be generally described in regard to FIG. 5 which is a representation of the set-up procedures for the employment of the recursive algorithm of the present invention. In addition to serving as an introduction to the method, the flow diagram of FIG. 5 will be referred to below to designate the significance of the various appendices. After the method of the present invention has been invoked, the binder control information is read and interpreted and the file name of the host program to be bound is sent to the disk file where a directory search is made for that file. If the host file is not found, the job is terminated. If the host file is found in the disk file, then that file is passed to the binding procedure for processing. After the new object code file has been created, the new segment dictionary and program parameter block are written into the new file code which is then locked and binding is terminated.

Figure 7:
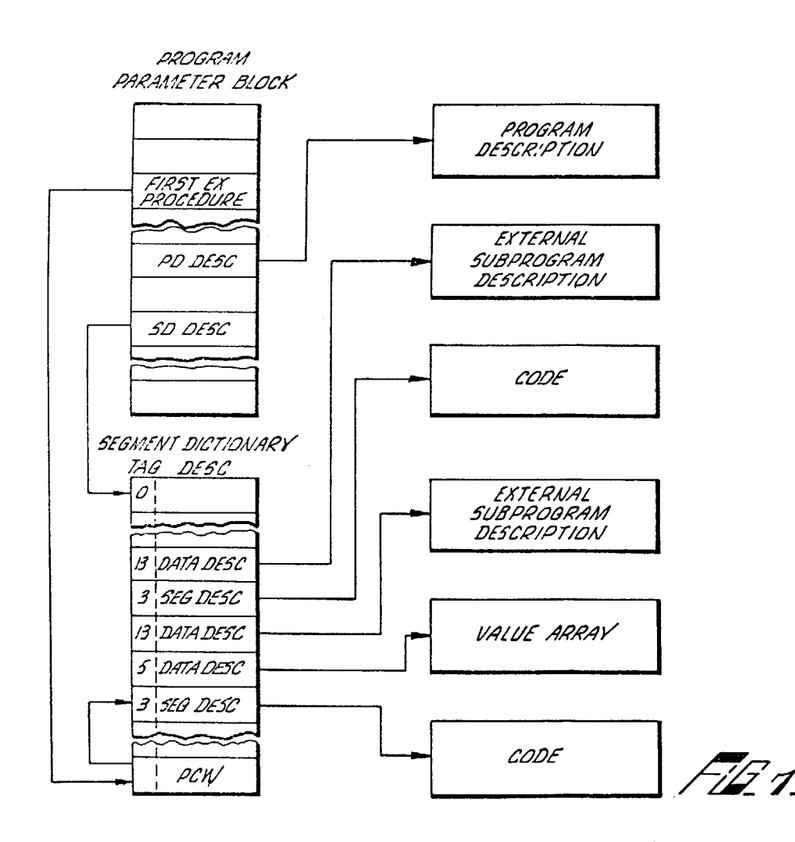
FIG. 7 is a diagram of the code file structure for a host program for which the present invention is adapted to create compiled object code.

The host program code file along with program parameter block and segment dictionary are illustrated in FIG. 7. The program parameter block includes a list of indicies to referrence various portions of the host program code, including the program description for the host code as well as the segment dictionary. The segment dictionary contains the descriptors for the various portions of the host code including program control words PCW which contain references to segment descriptors for external procedures to be bound to the host program but not residing therein. As indicated in FIG. 7, the segment dictionary will also include data descriptors to reference descriptions of external subprograms, that is to say, descriptions of the characteristics of the required subprograms and how they fit into the host program. The segment dictionary further includes data descriptors to reference value arrays as well as segment descriptors to reference the various code of that program.

During the binding procedure, the host program description is read and interpreted which results in the entering of items into a global information table, the checking of compatibility of global items and parameters, entering syllable pointers in the reference array (REFARY) of the current subprogram for changes required in code for that program unit, and entering syllable pointers into the parent reference array (PREFARY) for changes required in the host code.

For each missing subprogram encountered, the external subprogram description is retrieved from the disk file storage if it is not resident in memory and it is interpreted. The name of the file containing the separate subprogram is assigned to the subprogram file and a directory search is made. If the file is not found, the external program description is written into the code file for possible future use. If the file is found, then the entire binding procedure is called for recursively and the subprogram file and reference array (along with other parameters) are passed to that version or copy of the binding procedure. At this point, the binding currently in process is suspended until completion of the binding of the missing subprogram.

When all the missing subprograms have been bound, all required changes therein are known and can be made at once. At the end of the binding procedure, the global segment dictionary is up-dated to reflect all changes and additions.

Figure 6:
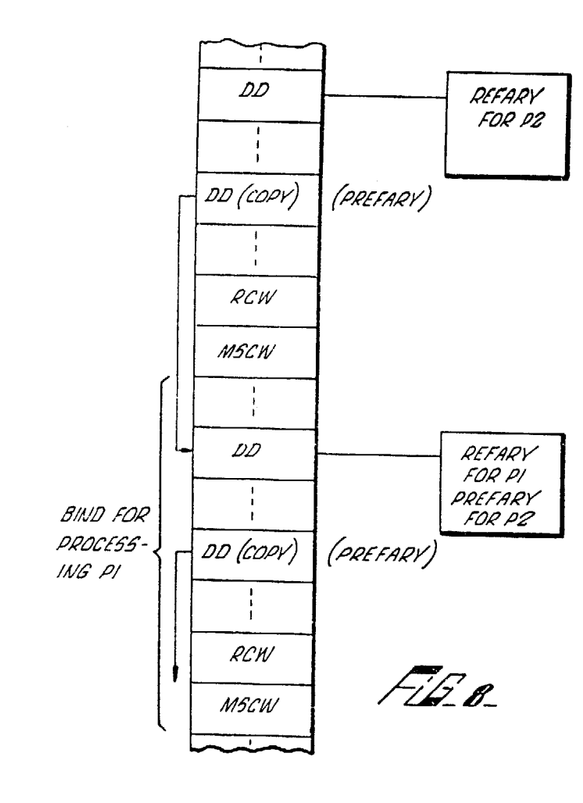
FIG. 6 is an illustration of the relation between FIGS. 6A and 6B.
Figure 6A:
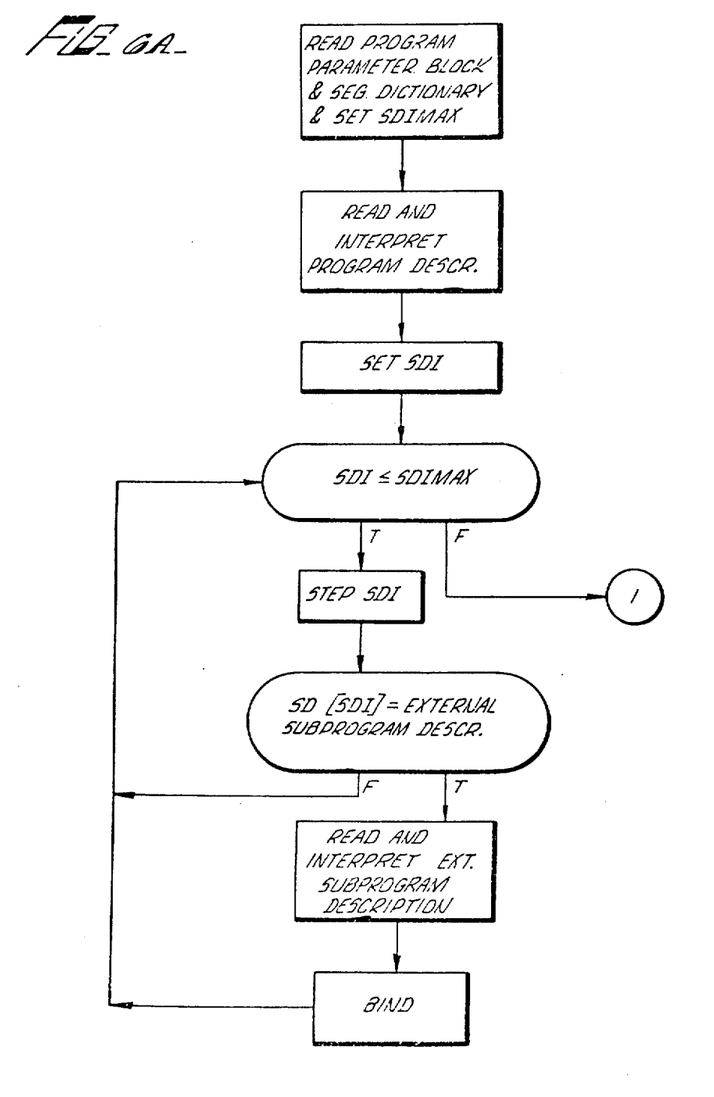
FIGS. 6A and 6B are flow diagrams of the binding algorithm of the present invention.

The specific steps practiced by the binding routine of the present invention will now be described in reference to FIGS. 6A and 6B. It will be remembered that the binding routine makes two passes through the respective segment dictionaries calling forth the external or missing subroutines during the first pass and making any code changes therein during the second pass. As illustrated in FIG. 6A, the binding routine first reads the program parameter block and the segment dictionary for the host program and sets the maximum number value, SDI (MAX), of the segment dictionary index, SDI. It then reads and interprets the program description of parent program. The procedure for then stepping through the segment dictionary includes the setting of the segment dictionary index and comparing that index to maximum prescribed value. If the segment dictionary index is less than the maximum value, it is stepped and the index, thus called for, is examined to see if it references an external subprogram description. If an external subprogram description is not referenced, then the segment dictionary index is then again compared with its prescribed maximum value and this portion of the procedure is repeated. If an external subprogram description was referenced by the segment dictionary index, that description is read and interpreted and the procedure then calls itself. That is to say the bind procedure of FIG. 6A and 6B is then re-entered.

Figure 6B:
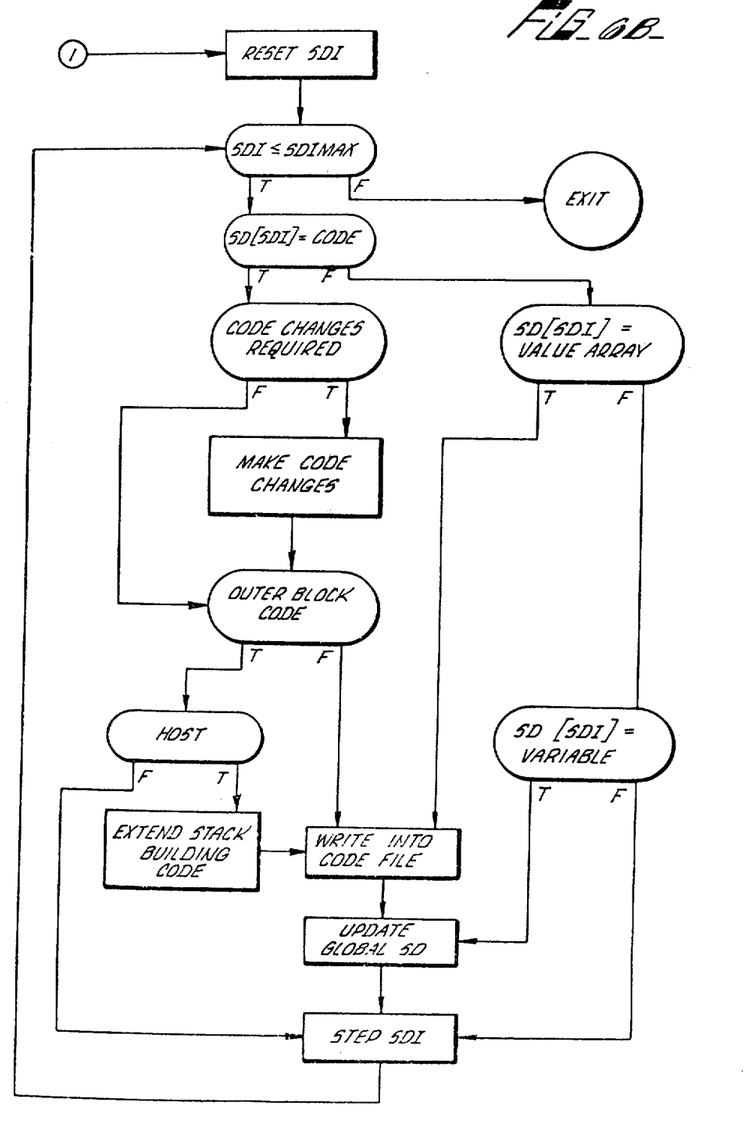

The procedure is continued until the segment dictionary index equals its maximum value in which case the procedure exits to its second portion as illustrated in FIG. 6B. That part of the routine, represented by FIG. 6A, embodies the manner in which the binding routine of the present invention continues to re-enter or call itself as additional subprograms are required to be bound to a parent program. As was pointed out in reference to FIG. 2D, such a recursive program must exit from itself the same number times as it re-entered itself. The exiting procedure of the binding algorithm of the present invention is illustrated in FIG. 6B.

In the exiting routine the segment dictionary index is reset and compared to see if it equals a maximum prescribed number value. If it does not, the index is checked to see if it references code in which case the reference array for the current routine is checked to see if changes are required and, if so, such changes are made. The code is then checked to see if it is an outer block code and if the program is a host program in which case the stack building code is extended and written into the new code file and the global segment dictionary is up-dated. If the segment dictionary index did not reference code, a check is made to see if the index references a value array. If it does, then that value array is written into the code file. If the index does not reference either code or a value array, a check is made to see the index references a variable and, if so, the global segment dictionary is up-dated. At the end of each portion of the exiting routine, the segment dictionary index is stepped and then compared to its maximum value and the procedures repeated until the index does equal its maximum value in which case the routine exits.

It will be remembered that each time the binding routine exits, it is exiting from a subversion or subcopy of the routine that had previously been called and thus it exits back to the previous version or copy of the routine so that version or copy of the binding routine can be completed and so forth. When the very first binding routine called has been exited from, the binding has been completed.

It will be remembered that each of the passes through a segment dictionary is through the segment dictionary for particular program unit being processed for additional binding, be that program a host program or subprogram. Thus the two passes through each segment dictionary are made for each version or copy of the binding routine. When each program unit is being processed for additional binding, its segment dictionary becomes a part of the reference array for that version of the binding procedure which also serves as the parent reference array for the binding process for a subprogram. To demonstrate this, reference is made to FIG. 8 which illustrates the status of the binding procedure currently being run and which is embodied in a stack. Reading up from the bottom, the binding procedure stack contains a Mark Stack Control Word (MSCW) to reference a stack in memory, a Return Control Word to invoke a return from a procedure, and a number of data descriptors. One of the data descriptors will reference the prior reference array for that version of the binding procedure which is ancestor to the current version of the binding procedure. A subsequent data descriptor references the reference array for the current binding procedure which in turn is the parent reference array for a subsequent version of the binding procedure. This over-lapping employment of the various reference arrays for both a current binding procedure and a subsequent binding procedure is illustrated in FIG. 8.

CONTROL INFORMATION

Certain control information to be supplied by the user will now be described. The files containing the program units that are to be bound together are specified in the binder input deck. A binder input deck contains certain required control cards and may or not contain an input file.

If there is an input file, the first card in the input deck must be one of the binder control cards:
? Bind X/F with binder; Data
? Bind X/F with binder library; Data
? Bind X/F with binder syntax; Data.
Each card will be followed by the input file.

The "?" represents an invalid character and must appear in the first column. X/F is a file name variable that will be the name of the file created by the binder which will contain the program units bound together. "Library" causes the file X/F to be stored on disk but not executed. "Syntax" causes X/F to be compiled but neither saved nor executed. If neither "Library" nor "Syntax" appear in the first card, X/F will be both compiled and executed. "With" is optional, and "BCL" may be specified instead of "Data". "Data" signifies that the binder input file is in EBCDIC and "BCL" signifies that it is in BCL. The input code may be specified on a separate control card following the binder control card ("? Data" or "? BCL").

If there is an input file, the control card "? End" must follow the input file, and will be the last card in the deck. If there is no input file, the binder input deck need contain only the control card, "? Bind X/F with binder; End".

The input file may contain four types of statements that may be placed in any order between the two required control statements. There may be any number of each of these four statements. A description of the structure of these statements follows:

1. Host statement—this statement has the form, "Host is H/F;". Where H/F is a file name variable. This identifies H/F as the file that contains the program unit to which other program units will be bound. If there is no host statement, the host will be the file that appears in the bind control card, by default;

2. Simple bind statement—this statement has the form, "Bind S/F for P;" where S/F is a file name variable and P is a procedure name variable;

3. Compound bind statement—this statement has the form, "Bind C/F/=for P1, P2, ... , PN;" where C/F is a file name variable. P1 through PN are procedure name variables, and $N > 1$;

4. Universal bind statement—this statement has the form, "Bind U/F/=;" where U/F is a file name variable.

Any program unit to be compiled separately and bound to the host program must be compatible with an external procedure declaration in the host. If P is such a procedure declared external in the host, the binder will attempt to find exactly one file for P, according to the order of precedence given below. If this file is found, and consists of the code for a program unit that is compatible with P, the binder will bind it to the host program. If this file is not found, the external procedure declaration for P will remain unchanged in the host, making binding of a program unit, that is compatible with P, possible at a later time.

The binder will first check to see if P appears in a simple bind statement. If P appears in one simple bind statement, the binder will search for the file S/F, where S/F is the file name in the simple bind statement. If P appears in more than one simple bind statement, the last one encountered will be used. If P does not appear in a simple bind statement, the binder will determine whether or not P appears in a compound bind statement. If P does appear in a compound bind statement, the binder will search for the file C/F/P, where C/F is the file name in the last compound bind statement in which P appears. If P does not appear in a simple or a compound bind statement, the binder will search for the file U/F/P, where U/F is the file name in the last universal bind statement (if one exists). If P does not appear in a simple or a compound bind statement and there is no universal bind statement, the binder will search for the file Z/F/P, where Z/F is the file name in the bind control card with the rightmost file ID deleted.

An example will now be presented in the form:
(A) ? Bind Resultant/Program With Binder Library
(B) ? Data
(C) Host Is The/Hostfile;
(D) Bind A/B For X1;
(E) Bind C/=For P2, P3;
(F) Bind Prefix/=;
(G) ? End.

(A) is a bind control statement, (C) is a host statement, (D) is a simple bind statement, (E) is a compound bind statement, and (F) is a universal bind statement.

In this example, "Resultant/Program" is the name of the file that will be created by the binder and which will contain all of the requested program units bound together. "Library" causes the file, Resultant/Program, to be entered in the disk directory, and "Data" signifies that the binder input deck is in EBCDIC. After binding, the program may be executed through the control card, "? Run Resultant/Program; End".

The statement, "Host Is The/Hostfile;", designates The/Hostfile as the file that contains the program to which separately compiled program units will be bound. Assume that the program units P1, P2, P3, and P4 are to be bound to The/Hostfile, and that the procedure names in the external procedure declarations for P1, P2, P3, and P4 are X1, P2, P3, and P4, respectively. Also assume that the files A/B, C/P2, C/P3, and Prefix/P4 exist, and consist of the code for P1, P2, P3, and P4, respectively. Then "Bind A/B for X1;" causes the program unit P1, stored in file A/B, to be bound to The/Hostfile in the file Resultant/Program. "Bind C/=for P2, P3;" causes the program units in the files C/P2 and C/P3 to be bound to The/Hostfile, and "Bind Prefix/=;" causes P4, stored in the file Prefix/P4, to be bound to the host.

Assume that P1 is an external procedure in a host program. In the following examples of binder input decks, the column Host will give the name of the file that is the host. P1 will give the name of the file that the binder attempts to find, which if found, should contain the code for a program unit that is compatible with the external procedure description. Result will give the name of the file that contains the final bound program.

|     |                          | HOST      | P1    | RESULT    |
| --- | ------------------------ | --------- | ----- | --------- |
| (A) | ? Bind R/M With Binder; End | R/M    | R/P1  | R/M       |
| (B) | ? Bind R/M With Binder; Data Host Is X/Y; Bind A/B for P1; ? End | X/Y | A/B | R/M |
| (C) | ? Bind X/Program Binder ? BCL Bind V/=for L, P1; ? End | X/Program | V/P1 | X/Program |
| (D) | ? Bind J/C/S Binder Library ? Data Host Is Red; Bind Help/=; Bind A/Z For P1; Bind C/=For P3, P4; Bind Now/R/=; Bind B/Z For P1; Bind F/=For P7, P1, P2; Bind G/=For P3, N8; ? End | Red | B/Z | J/C/S |

In order to provide a more complete disclosure, there are provided below five appendices which are print outs of various sections of the system of the present invention. In order for proper correlation between the respective appendices and the routines discussed above, the appendices will now be identified.

Appendix A: System Description and Global Declarations.
Appendix B: Utility Routines.
Appendix C: Search and Re-enter Routine.
Appendix D: Correction, Copy and Exit Routine.
Appendix E: Wraps-up, Print Information on New Code File, and Statements to call Routines.

The above appendices are not part of the printed patent but are available in the Patented File (37 CFR 1.96b) and represent a complete system of the present invention.

EPILOGUE

A system and method have thus been described to call forth precompiled subroutines and to bind them to a new code file as required by a host program. The host program is initially created in a source language which is supplied to a compiler of a data processing system for compilation into strings of machine language instructions or object code. However, when the compiler determines that a subroutine called for has already been precompiled, a descriptor referencing that subroutine is created and entered into a reference list or segment dictionary also created by the compiler for the host program. The system and method of the present invention are adapted to search that reference list or segment dictionary for the host program and, when a reference to an external or missing subroutine is detected, the system and method are then re-entered to search the corresponding reference list or segment dictionary for that subroutine to determine if it, in turn, requires external or precompiled subroutines as part thereof. When no further external subroutines have been found, the precompiled object code for the present subroutine is corrected, as may be required, and that object code is copied or bound to the new object code file being created for the host program.

The system and method of the present invention are, thus, recursive in nature in that they involve a search through the segment dictionary of the parent program or routine and, when a missing precompiled subroutine is referenced, the system and method are then re-entered to search the segment dictionary for that routine and so forth. With the present system and method, a host program may be created in the form of a plurality of nested subroutines and but one system need be provided for the binding together of precompiled subroutines, the system recalling itself as required.

While but one embodiment of the present invention has been described and illustrated, it will be apparent to those skilled in the art that changes and modifications may be made therein which changes and modifications, never the less, will not depart from the spirit and scope of the invention as claimed.

What is claimed is:

1. An information processing system for completing the object code for a host program routine by fetching and binding, to said object code, different levels of precompiled subroutines, said system comprising:
   storage means to receive a series of program lists for said host program and different levels of subroutines required to be bound to said host program routine; and
   processor means coupled to said storage means to search said host program list for references to precompiled subroutines, said processor means being adapted to re-enter its search routine, when such a reference is found, to search a program list of the referred-to subroutine for references to a next level of precompiled subroutines required to be bound to said referred-to subroutine;
   said processor means being further adapted to execute the host program object code thus completed.

2. An information processing system according to claim 1 which further includes:
   means to enter changes in the object code of said referred-to subroutine and to copy said code into a new code file being created for said host program routine.

3. An information processing system according to claim 2 wherein:
   said search means is adapted to search said referred-to program list for additional references to next level precompiled subroutines upon the completion of copying object code of a previous next level subroutine into the new code file by said change and copy means.

4. An information processing system according to claim 3 wherein:
   said search means is further adapted to repeat the search of said program list for said host program routine for additional references to precompiled subroutines.

5. An information processing system for receiving object code and a series of program lists for a host program routine and different levels of subroutines required to be bound to said host program and for completing the object code for that host program routine by fetching and binding, to said object code, said different levels of precompiled subroutines, said system comprising:
   storage means to receive said object code, program lists and precompiled subroutines; and
   processor means coupled to said storage means to search said host program list for references to precompiled subroutines required to be bound to said host program, said processor means being adapted to re-enter its search routine, when such a reference has been found, to search a program list of said referred-to subroutine for references to a next level of precompiled subroutines required to be bound to said referred-to subroutine;
   said processor means being further adapted to enter changes in the object code of said referred-to subroutine and to copy said code into a new code file being created for said host program routine;
   said processor means being stack oriented and including a plurality of registers to accommodate information stored in said storage means as push down stacks.

6. An information processing system according to claim 5 wherein:
   said search means is adapted to search said subroutine program list for additional references to precompiled next level subroutines upon the completion of copying object code of a previous next level subroutine into the new code file by said change and copy means.

7. An information processing system according to claim 6 wherein:
   said search means is further adapted to repeat the search of said program list for said host program routine for additional references to precompiled subroutines.

8. In an information processing system for completing the object code for a host program routine, the method of fetching precompiled subroutines from a storage device and binding them to the host object code, said method comprising:
   receiving a program list of subroutines required to be bound to said host program routine;
   searching said host program list for references to precompiled subroutines required to be bound to said host program object code;
   sensing a reference to a precompiled subroutine;
   receiving and searching a program list for said referred-to precompiled subroutine for references to a next level of precompiled subroutines required to be bound to said previous level subroutine; and
   executing, in said system, said host program routine object code thus completed.

9. A method according to claim 8 which further includes:
   entering changes in the object code of said referenced subroutine and copying said code into a new code file being created for said host program routine.

10. A method according to claim 9 which further includes:
   searching said subroutine program list for additional references to next level precompiled subroutines upon the completion of copying object code of said previous next level subroutine into the new code file being created.

11. A method according to claim 10 which further includes:
repeating the search of said host program list for additional references to precompiled subroutines.

12. In an information processing system for receiving object code and a series of program lists for a host program routine and different levels of subroutines required to be bound to said host program routine, and for completing the object code for said host program routine by fetching precompiled subroutines as required to be bound to the host program object code, the method comprising:
searching said host program list for references to precompiled subroutines;
sensing, in said host program list, a reference to a precompiled subroutine;
receiving and searching a program list for said referred-to subroutine for references to a next level of precompiled subroutines required to be bound to said previous level subroutine; and
entering changes in the object code of said referred-to subroutine and copying said code into a new code file being created for said host program routine; and
executing, in said system, said host program routine object code thus completed.

13. A method according to claim 12 which further includes:
searching said subroutine program list for additional references to next level precompiled subroutines upon the completion of said copying object mode of previous next level subroutine into the new code file being created.

14. A method according to claim 13 which further includes:
repeating the search of said host program list for additional references to precompiled subroutines.

15. A method according to claim 12 which further includes:
entering changes in the object code of said host program routine when required by said referred-to subroutine.

16. In an information processing system having a stack oriented processor including a plurality of registers to accommodate information stored in memory as push down stacks, said system being adapted for receiving object code and program lists for a host program routine and different levels of subroutines required to be bound to said host program routine, and for completing the object code for said host program routine by fetching precompiled subroutines required to be bound to said object code, the method comprising:
searching a host program list for references to precompiled parent subroutines required to be bound to said host program object code;
receiving a reference to a precompiled parent subroutine and fetching a program list for said parent subroutine;
searching said program list for said referred-to precompiled parent subroutine for references to next level precompiled subroutines required to be bound to said parent subroutine;
receiving and searching a program list for a referred-to next level precompiled subroutine for references to further level precompiled subroutines required to be bound to said next level subroutine;
fetching object code of a referred-to further level subroutine;
entering changes in the object code of said next level subroutine and copying said code into a new code file being created for said parent subroutine; and
entering changes in the object code of said parent subroutine and copying said code into the new code file being created for said host program routine.

17. A method according to claim 16 which further includes:
searching the program list for said parent subroutine for additional references to precompiled next level subroutines upon completion of the copying object code of the previous next level subroutine into the new code file being created.

18. A method according to claim 17 which further includes:
searching said host program list for additional references to precompiled parent subroutines.

* * * * *